United States Patent
Tada (10) Patent No.: US 7,447,915 B2
(45) Date of Patent: Nov. 4, 2008

(54) MAP DATA PROCESSING METHOD, MAP DATA PROCESSING DEVICE, STORAGE MEDIUM, AND ON-BOARD MAP DATA PROCESSING DEVICE

(75) Inventor: Akihito Tada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 812 days.

(21) Appl. No.: 10/271,591

(22) Filed: Oct. 17, 2002

(65) Prior Publication Data

US 2003/0084313 A1    May 1, 2003

(30) Foreign Application Priority Data

Oct. 23, 2001    (JP)    ............................. 2001-325267

(51) Int. Cl.
*G06F 12/14*    (2006.01)
*H04K 1/00*    (2006.01)
*G01C 21/00*    (2006.01)

(52) U.S. Cl. .......................... 713/193; 701/200; 726/30
(58) Field of Classification Search ................. 713/193; 701/200; 726/30
See application file for complete search history.

(56) References Cited

U.S. PATENT DOCUMENTS

| 5,065,429 A | | 11/1991 | Lang |
| 5,748,735 A | * | 5/1998 | Ganesan ..................... 713/165 |
| 5,787,170 A | | 7/1998 | Op de Beek |
| 5,857,021 A | * | 1/1999 | Kataoka et al. ................ 705/54 |
| 5,951,620 A | * | 9/1999 | Ahrens et al. ................ 701/200 |
| 5,999,622 A | | 12/1999 | Yasukawa et al. |
| 6,768,942 B1 | * | 7/2004 | Chojnacki .................... 701/200 |
| 7,096,504 B1 | * | 8/2006 | Tagawa et al. ................ 726/27 |
| 2002/0091758 A1 | * | 7/2002 | Singh et al. ................. 709/203 |

FOREIGN PATENT DOCUMENTS

| CN | 1316706 A | 10/2001 |
| EP | 1 189 409 A2 | 3/2002 |
| JP | A-62-162171 | 7/1987 |
| JP | A-03-116342 | 5/1991 |
| JP | A-09-026562 | 1/1997 |
| JP | A-09-026563 | 1/1997 |
| JP | A-09-026769 | 1/1997 |
| JP | A-10-145773 | 5/1998 |
| JP | A-2000-503154 | 3/2000 |
| JP | A 2000-146619 | 5/2000 |
| JP | A-2000-172821 | 6/2000 |
| JP | 2002357428 A * | 12/2002 |
| KR | 1999-0083971 | 12/1999 |
| WO | WO 00/31964 | 6/2000 |

* cited by examiner

*Primary Examiner*—Emmanuel L Moise
*Assistant Examiner*—Michael Pyzocha
(74) *Attorney, Agent, or Firm*—Oliff & Berridge, PLC (57) ABSTRACT

A map data processing method for handling map data stored in a portable storage medium includes the steps of encrypting only a portion of the map data to be stored on the storage medium, and storing the map data, of which only the portion has been encrypted, on the storage medium. According to this processing method, it is possible to reduce the time necessary for encryption and decryption. In addition, by both encrypting and decrypting the map data based on a code specific to the storage medium, it is possible to minimize illegal copying of the map data.

8 Claims, 7 Drawing Sheets

MAP DATA PROCESSING METHOD, MAP DATA PROCESSING DEVICE, STORAGE MEDIUM, AND ON-BOARD MAP DATA PROCESSING DEVICE

INCORPORATION BY REFERENCE

The disclosure of Japanese Patent Application No. 2001-325267 filed on Oct. 23, 2001 including the specification, drawings and abstract is incorporated herein by reference in its entirety.

BACKGROUND OF THE INVENTION

1. Field of Invention

The invention relates to a map data processing method for handling map data stored on a portable readable/writable storage medium, such as a memory card, a map data processing device, the storage medium that can be used therewith, and an on-board map data processing device.

2. Description of Related Art

A system has been known in which the latest map data is stored for a fee on a storage medium (e.g., smart media), called a memory card, from a map data vending machine (hereinafter referred to as "kiosk terminal") located at a gas station or convenience store or the like. This storage medium is then used with an on-board navigation system or the like, and the map data stored on the storage medium is used for route guidance. An example of this kind of system is disclosed in Japanese Patent Laid-Open Publication No. 2000-146619. According to this system, the use of the latest map data for route guidance enables accurate route guidance to be provided.

According to this system, however, the map data stored on the storage medium can be copied to another storage medium of the same type, and the copied map data can then be used by the navigation system. That is, with this system, it is possible to illegally copy the map data, which would adversely affect the sales of the map data. To counter this, it is conceivable to store the map data on the storage medium after it has been encrypted by the kiosk terminal. The encrypted map data could then be used after it has been decrypted by the navigation system. As a result, illegal copying of the map data can be minimized.

When all of the map data is encrypted, however, it takes time to decrypt it. This method is therefore unsuitable for devices that require rapid data processing, such as navigation systems.

SUMMARY OF THE INVENTION

Accordingly, it is an object of the invention to provide a map data processing method, device, storage medium, and on-board map data processing device, which enables illegal copying of map data to the storage medium to be minimized while keeping the processing time of the map data short.

This invention therefore provides a map data processing method for handling map data, which includes an encryption step for encrypting only a portion of the map data to be stored on the storage medium, and a storage step for storing the map data of which only the portion was encrypted on the storage medium.

This invention also provides a map data processing device that encrypts only a portion of the map data as described above, a storage medium on which that map data is stored, and an on-board map data processing device that decrypts the encrypted map data stored on the storage medium.

In this case, the portion of the map data to be encrypted, of the map data to be stored on the storage medium, is, for example, data pertaining to a region dense with roads, a region dense with facilities, and a region including important information as map data such as main roads and the like. It is preferable that if this data is not available, either the value of the data as map data is reduced drastically, or the data for that region of the map data will essentially become nonfunctional.

Accordingly, because only a portion of the map data to be stored is encrypted, it is possible to both minimize illegal use of the map data, as well as shorten the time necessary for encrypting and decrypting compared to when all of the map data is encrypted. Thus, it is possible to provide map data that can be used in an on-board map data processing device such as a navigation system with a portable storage medium.

BRIEF DESCRIPTION OF THE DRAWINGS

The above and other objects, features, advantages, technical and industrial significance of this invention will better be understood by reading the following detailed description of preferred embodiments of the invention, when considered in connection with the accompanying drawings, in which.

DETAILED DESCRIPTION OF PREFERRED EMBODIMENTS

In the following description and the accompanying drawings, the invention will be described in more detail in terms of exemplary embodiments.

Figure 1:
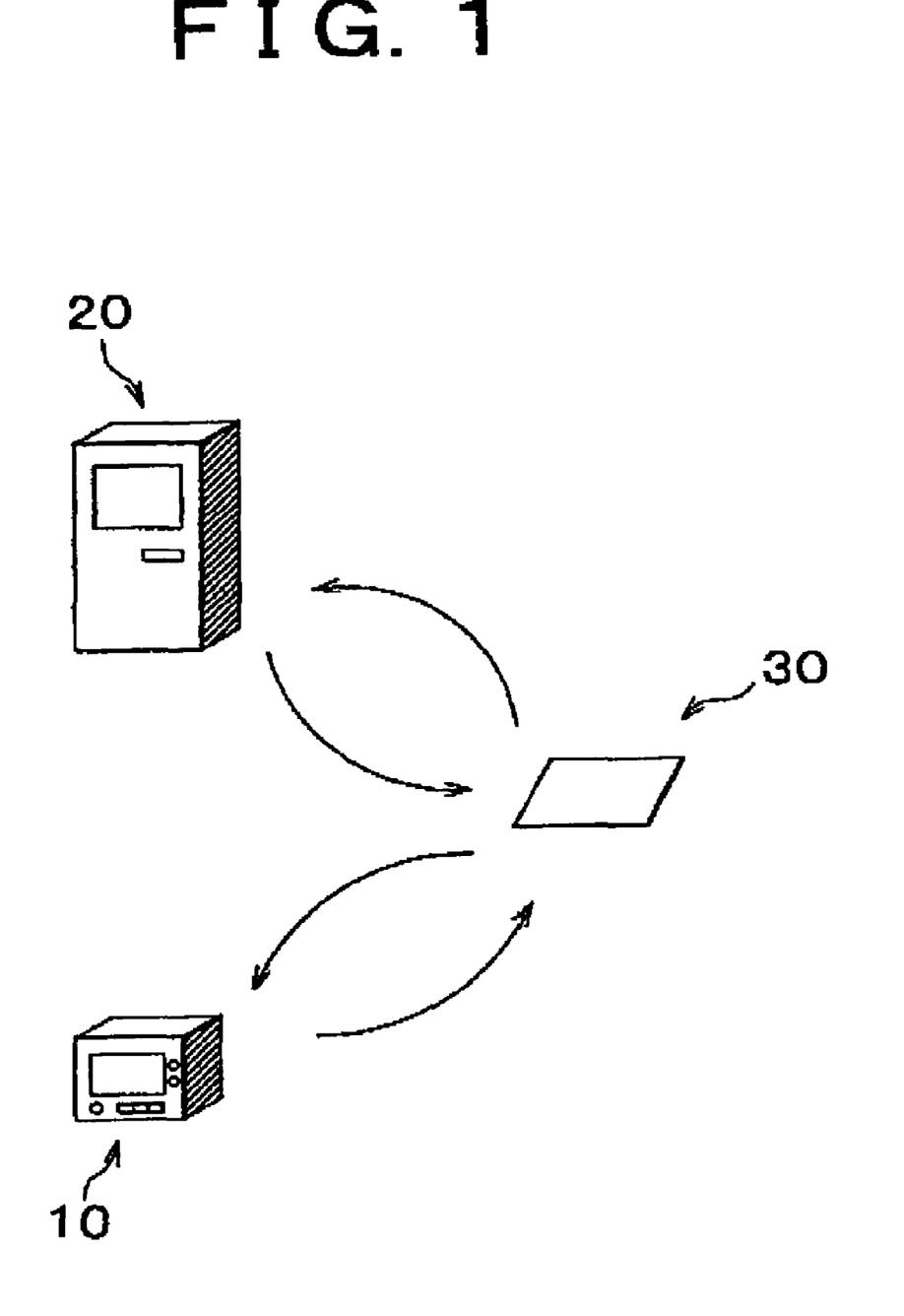
FIG. 1 is a view of the overall structure of a map data distribution system according to one exemplary embodiment of the invention.

FIG. 1 shows the overall structure of a map data distribution system. This system includes a navigation system (navigation terminal) 10 as an on-board terminal mounted in the respective vehicle, a kiosk terminal (ground-based terminal, map data vending machine) 20 that is located in a preferable location such as at a station, a convenience store, or a gas station, and a memory card 30 which is a semiconductor storage medium (e.g., smart media). This memory card 30 is a portable, readable/writable storage medium for data, including map data. A serial number specific to each memory card 30 is written in a read only code (i.e., a card identification code) onto the card as data.

Figure 2:
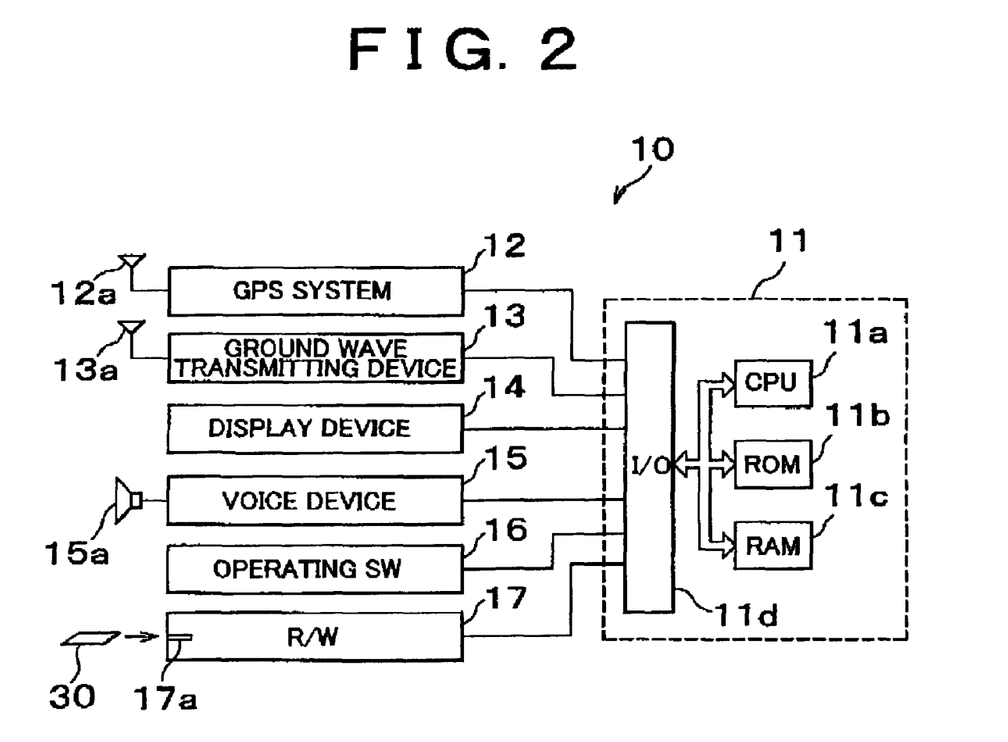
FIG. 2 is a block view of a navigation system shown in FIG. 1.

Referring to FIG. 2, the navigation system 10 includes an microcomputer 11 as its main component. This microcomputer 11 includes a CPU (Central Processing Unit) 11a, ROM (Read Only Memory) 11b, RAM (Random Access Memory) 11c, and an input/output interface 11d that are all connected by a bus. The CPU 11a executes a program (routine), to be described later, stored in the ROM 11b using the data storage function of the RAM 11c.

Also, the navigation system 10 further includes a GPS system (Global Positioning System) 12, a ground wave transmitting device 13, a display device 14, a voice device 15, an operating switch portion 16, and a read/write device 17 that are each connected to the input/output interface 11*d* such that signals can be sent therebetween.

The GPS system 12 is connected to an antenna 12*a* that receives GPS signals from a GPS satellite, not shown. The GPS system 12 then identifies the position (hereinafter referred to as "vehicle position") of the vehicle in which it is installed using the GPS signals received via the antenna 12*a* at predetermined intervals of time (e.g., 1 second), and sends data indicative of the identified vehicle position to the microcomputer 11.

Figure 3:
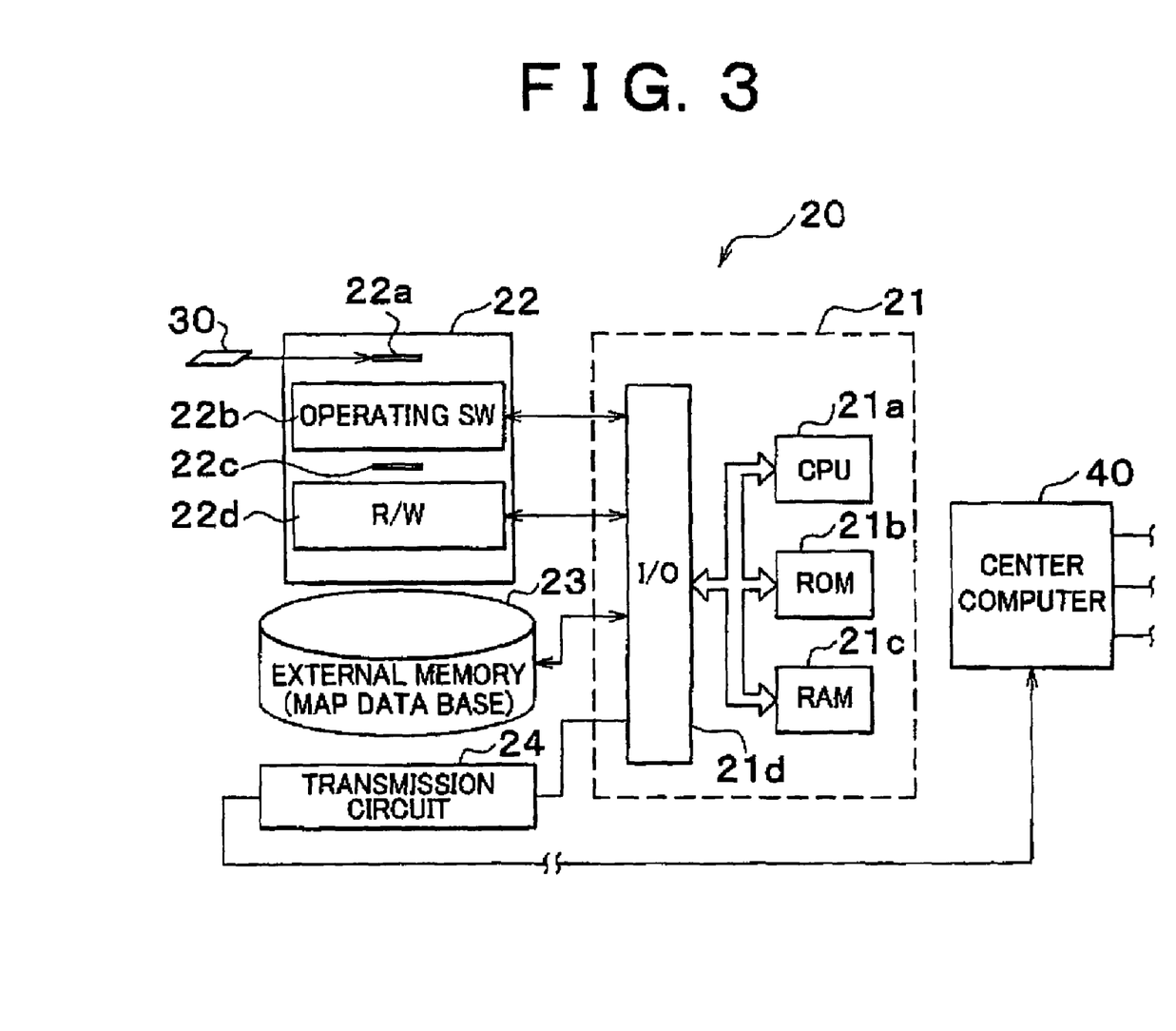
FIG. 3 is a block view of a kiosk terminal shown in FIG. 1.

The ground wave transmitting device 13 is connected to a ground wave antenna 13*a*, and receives wireless signals from a center computer 40 (see FIG. 3). The display device 14 includes a display, not shown, and displays information such as the necessary map according to a command signal from the microcomputer 11. The voice device 15 is connected to a speaker 15*a* and generates the necessary voice according to a command signal from the microcomputer 11. The operating switch portion 16 includes a plurality of switches, which, when operated by the user, enable predetermined information such as a destination to be entered into the microcomputer 11.

The read/write device 17 includes card holding means 17*a* for holding the memory card 30 in a detachable (ejectable) manner. The read/write device 17 both reads the data on the inserted memory card 30 and writes the necessary data onto the memory card 30 according to commands from the microcomputer 11.

The navigation system 10 of the foregoing structure then reads the map data according to the vehicle location obtained by the GPS system 12 and the destination that was input using the operating switch portion 16, and the like, from the memory card 30 inserted into the card holding means 17*a*. Then, after decrypting the read map data, as will be described later, the navigation system 10 then displays that map data as a map on the display device 14.

Referring now to FIG. 3, the kiosk terminal 20 includes a microcomputer 21. This microcomputer 21 includes a CPU 21*a*, ROM 21*b*, RAM 21*c*, and an input/output interface 21*d*, which are all connected together via a bus. The CPU 21*a* executes a program (routine), to be described later, stored in the ROM 21*b* using the data storage function of the RAM 21*c*.

Also, the kiosk terminal 20 further includes a read/write device 22, an external memory 23, and a transmission circuit 24. The read/write device 22 includes a holding portion (holding means) 22*a* that detachably (ejectably) holds the memory card 30, an operating switch portion 22*b* operated by the user, and a read/write portion 22*d*. This read/write portion 22*d* reads the map data as well as the serial number and the like of the memory card 30 from the inserted memory card 30. The read/write portion 22*d* also writes map data and the like onto the memory cad 30. Of these devices and the like that are further included in the kiosk terminal 20, the operating switch portion 22*b* and the read/write portion 22*d* are connected to the input/output interface 21*d* such that signals can be sent between the operating switch portion 22*b* and the read/write portion 22*d* and the microcomputer 21.

The external memory 23 may be a hard disk, an MO (magneto-Optical Disk), or the like, which is connected to the input/output interface 21*d* such that data can be exchanged with the microcomputer 21. The external memory 23 provides the microcomputer 21 with necessary information, such as map data and programs, and stores necessary information according to a command from the CPU 21*a*. Therefore, the external memory 23 functions as a map data base. The map data stored on the external memory 23 is data that has not undergone any type of encryption processing.

The transmission circuit 24 is connected to the input/output interface 21*d* of the microcomputer 21, as well as to the center computer 40, which is remotely located, via a predetermined network. The transmission circuit 24 obtains various data, such as the latest map data and data related to the fee for that map data, and the like, from the center computer 40, and supplies this data to the microcomputer 21.

Next, operation of the map processing system described above will be described. The CPU 21*a* of the kiosk terminal 20 executes the program shown in FIG. 4 when the user inserts the memory card 30 into the read/write device 22, identifies the map data that the user wishes to purchase using the operating switch portion 22*b*, and inserts the fee for the map data into a cash insertion slot 22*c*.

Figure 4:
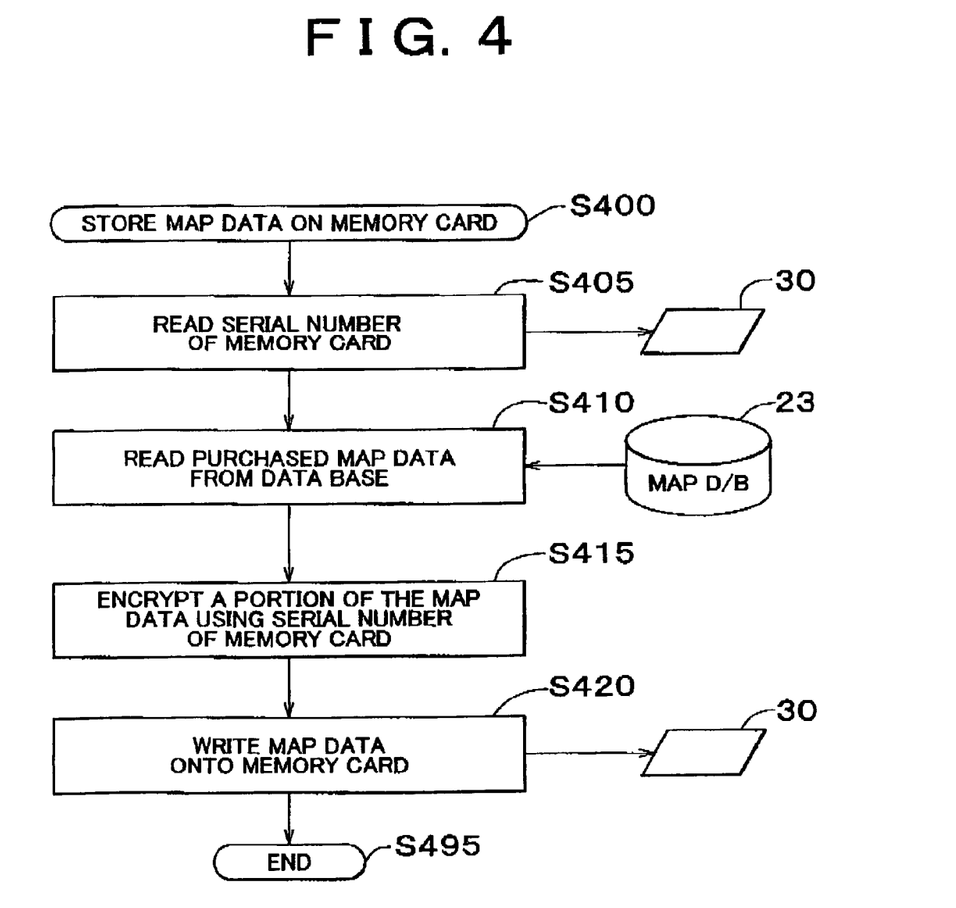
FIG. 4 is a flowchart showing a program executed by a CPU of the kiosk terminal shown in FIG. 3.

More specifically, the CPU 21*a* starts the process from Step S400 and proceeds to Step S405. In Step S405, the serial number stored on the memory card 30 is read. Then in Step S410, the map data (i.e., the purchased map data) identified by the user is read from the external memory (i.e., map data base) 23. Next, the program proceeds to Step S415, where the CPU 21*a* encrypts a portion of the map data using the serial number of the memory card 30 read in Step S405 as the key (i.e., secret key). Alternatively, a suitable key may be generated from the serial number and a predetermined function, and encryption may be done using that key instead of using just the serial number as the key.

Figure 5A:
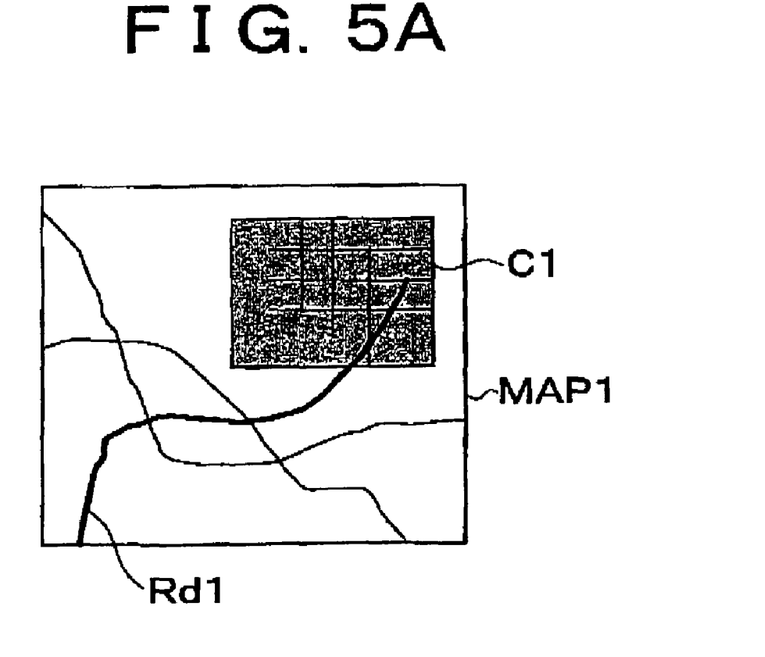
FIG. 5A is a view, in frame format, of a map having a portion dense with roads.
Figure 5B:
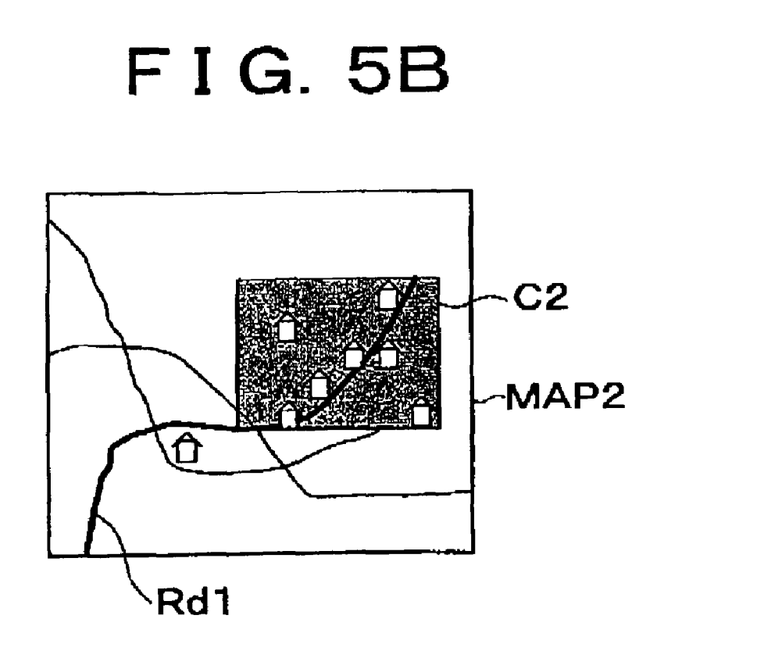
FIG. 5B is a view, in frame format, of a map having a portion dense with facilities.

Here, the encryption will be described in detail with reference to FIGS. 5A and 5B. The map data is map information covering a specific region, as shown in FIGS. 5A and 5B, which has been put into data format. In a map MAP 1 shown as an example in FIG. 5A, a region C1 is dense with roads. These regions offer relatively important map data compared with regions not as dense with roads. Here, the kiosk terminal 20 encrypts only this road-dense region C1. Also, when there is no road-dense region C1, as shown in a map MAP 2 in FIG. 5B, only a region C2 dense with facilities is shown. In this way, the kiosk terminal 20 selects the relatively important portion as the map data, and encrypts only the selected portion. As the map information, the relatively important portion may be one or a plurality of main roads (e.g., a highway, a national highway), or one or a plurality of large facilities (e.g., a prefectural office, city hall, a gymnasium, a baseball stadium).

Referring back to FIG. 4, the program proceeds to Step S420, where the CPU 21*a* writes (stores) the map data, of which only the aforementioned portion has been encrypted, on the memory card 30 in a format that includes data indicative of the serial number of the memory card 30. The program then proceeds on to Step S495 where it ends. According to that program, the purchased map data, of which a portion has been encrypted, as well as the data that can indicate the serial number of the memory card 30 (i.e., the data in which the serial number is identifiable), are stored on the memory card 30.

Next, the operation of the device will be described in a case when the user inserts the legitimate memory card 30 on which the aforementioned map data has been stored into the read/write device 17 of the navigation system 10 and uses the data information stored on the memory card 30 for route guidance or the like.

Figure 6:
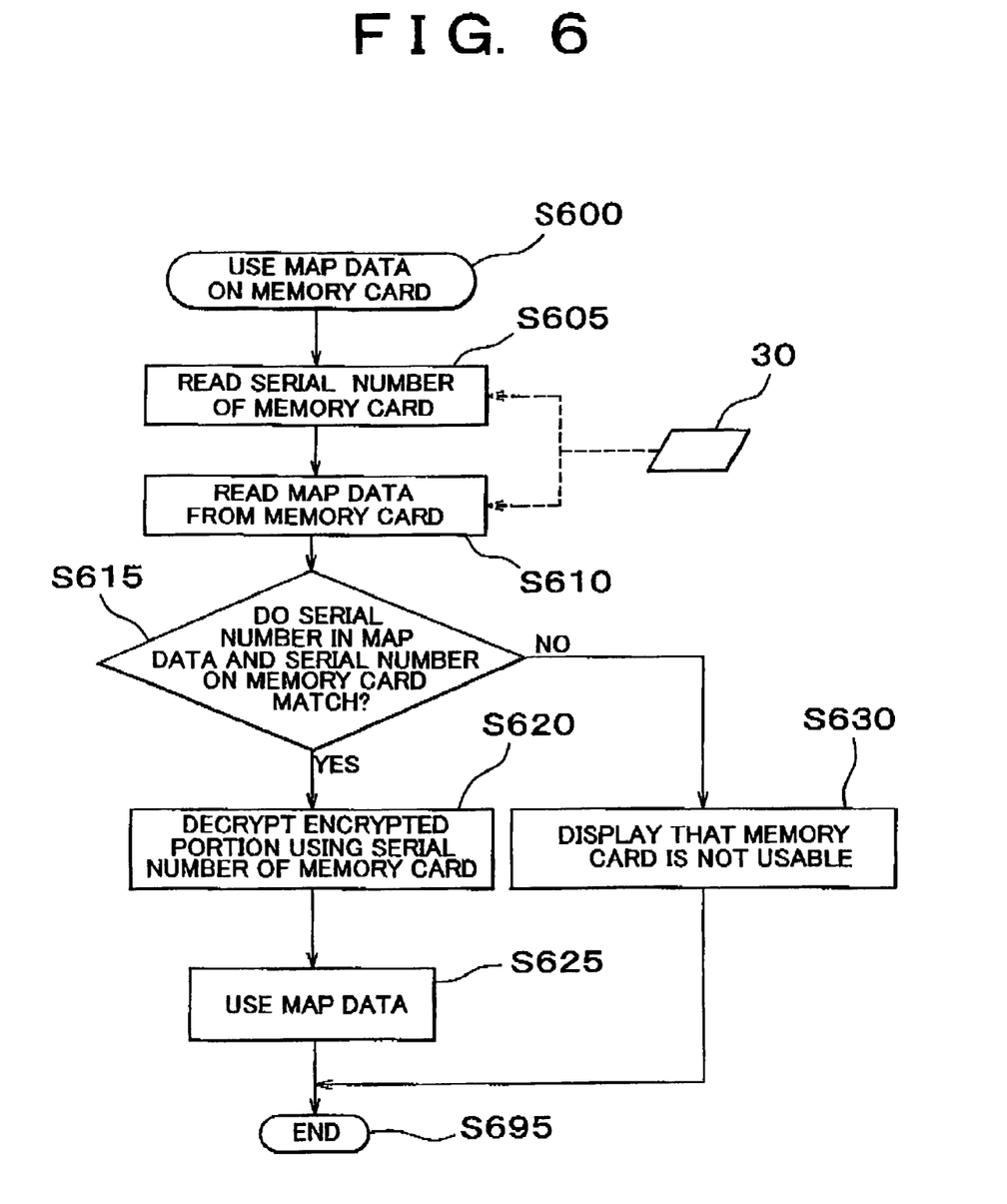
FIG. 6 is a flowchart showing a program executed by a CPU of the navigation system shown in FIG. 2.

In this case, the CPU 11*a* of the navigation system 10 starts the program shown in FIG. 6, starting with Step S600. Then in Step S605, the CPU 11*a* reads the serial number of the memory card 30 that has been inserted into the read/write device 17. The program then proceeds on to Step S610, where the CPU 11a reads the map data from the memory card 30. Then in Step S615, the CPU 11a replays the serial number from the data indicative of the serial number that is included in the map data that is read. The CPU 11a then determines whether this serial number matches with the serial number of the memory card 30 that was read in Step S605.

Accordingly, at this time, because the legitimate memory card 30 is inserted in the read/write device 17, the serial number replayed from the data included in the map data matches with the serial number of the memory card 30 inserted into the read/write device 17. Therefore, the determination by the CPU 11a in Step S615 is "YES" and the program proceeds on to Step S620. In Step S620, the CPU 11a decrypts the encrypted portion of the map data read in Step S610 using the serial number read in Step S605 as the key, and creates normal map data with no encrypted portions. When the map data in the kiosk terminal 20 is encrypted using the key generated based on the serial number of the memory card 30 and a predetermined function, the navigation system 10 generates the key based on the serial number of the memory card 30 that was inserted into the read/write device 17 and the predetermined function, and decrypts the encrypted map data using that key.

Next, the program proceeds on to Step S625, where the CPU 11a uses the map data that was decrypted in Step S625 to perform route guidance processing. In this route guidance, a map based on the created map data is displayed on the display device 14. Then, when the microcomputer 11 finishes the route guidance processing in Step S625, the program proceeds on to Step S695 where it ends.

As described above, when the legitimate memory card 30 is used, the navigation system 10 decrypts the encrypted portion of the map data stored on the memory card 30 based on the serial number of the memory card 30 normally. As a result, normal (i.e., non-encrypted) map data is obtained which the navigation system 10 then uses for route guidance and the like.

Next, a case in which map data has been copied illegally onto the memory card 30 and that memory card 30 has been inserted into the read/write device 17 of the navigation system 10 will be described. This kind of illegal copying can be done, for example, by inserting the legitimate memory card 30 into a typical personal computer, decrypting the encrypted map data with the personal computer, creating map data in which there is no encrypted portion, and storing this on another memory card 30.

When the illegal memory card 30 is inserted into the read/write device 17, the CPU 11a reads the serial number from the inserted memory card 30 in Step S605, and reads the map data from the memory card 30 in Step S610, after which the program proceeds to Step S615. In this case, the serial number played back from the data relating to the serial number included in the map data does not match the serial number of the memory card 30 read in Step S605. Therefore, the determination by the CPU 11a in Step S615 is "NO" and the program proceeds on to Step S630. In Step S630, a display indicating that the memory card 30 can not be used is displayed on the display device 14 and the program proceeds directly to Step S695 where it immediately ends.

Accordingly, the memory card 30 on which map data has been copied illegally can not be used by the navigation system 10 because it has a serial number that is different from the serial number based on the data stored on the map data.

Next, illegal copying and falsification of data will be described. In this case, map data purchased (stored) legitimately on the memory card 30 is illegally copied onto another memory card 30 of the same type. Further, the data pertaining to the serial number included in the map data on the memory card 30 on which that illegal copy was made has been falsified so that the serial number is the same as the serial number of the memory card 30 having the illegal copy. In this case, after the CPU 11a has performed the processes in Steps S600 through S610, program proceeds on to Step S615, where the determination by the CPU 11a is "YES". The program then proceeds on to Step S620, where the encrypted portion of the data is decrypted using the serial number of the memory card 30 having the illegal copy.

Because the portion of the map data is encrypted using the serial number of the legitimate memory card 30, however, the map data that was decrypted in Step S620 becomes corrupted (i.e., the normal data is unable to be decrypted), and the map data is unable to be used normally in Step S625. That is, this type of corruption renders the memory card 30 having the illegal copy unusable.

As described above, according to the map data processing system of this exemplary embodiment, the map data is purchase from the kiosk terminal 20, and this purchased map data is stored on the memory card 30 that has been inserted into the read/write device 22 of the kiosk terminal 20. At this time, the kiosk terminal 20 encrypts the important portion of the map data as the map information using a code (i.e., a serial number) that is specific to, and stored on, the inserted memory card 30, and stores the encrypted map data on the memory card 30. Then, when the memory card 30 is inserted into the read/write device 17, the navigation system 10 decrypts the encrypted portion of the map data stored on the memory card 30 using the code specific to the inserted memory card 30, and creates legitimate map data that is not encrypted. Also, if the code (i.e., the serial number) specific to the memory card 30 that was inserted into the read/write device 17 does not match the specific code (i.e., the serial number) that is replayed based on the data written into the map data, it is determined that the memory card 30 is making an illegal copy of the map data and the navigation system 10 renders the map data on the memory card 30 unusable (i.e., prohibits use of the map data on the memory card 30).

Accordingly, when the encrypted map data that is stored on the legitimate memory card 30 has been illegally copied to another memory card 30, the map data is not correctly decrypted, or the memory card 30 having the illegal copy is rendered unusable. It is possible to therefore minimize illegal copying of the map data to another memory card 30.

It shall be noted that the invention is not limited to the foregoing exemplary embodiment, but may be implemented with further variations and modifications within the intended scope of the invention. For example, in the foregoing exemplary embodiment, the map data is encrypted by the kiosk terminal 20 and decrypted by the navigation system 10. Alternatively, however, map data encrypted similarly by the navigation system 10 may be stored on the memory card 30 and that map data stored on the memory card 30 may be decrypted by the kiosk terminal 20.

Further, it is preferable that the kiosk terminal 20 be configured so as to be able to store newly purchased map data of one specific region either on the memory card 30 on which map data of another specific region has already been legitimately stored, or on a different memory card 30. More specifically, the kiosk terminal 20 reads the map data stored on the memory card 30 from the inserted memory card 30 and decrypts that map data using the serial number of the memory card 30. The kiosk terminal 20 then adds the different newly purchased map data to the decrypted map data and creates expanded map data to be stored. The kiosk terminal 20 then encrypts a portion of the created expanded map data using the serial number of the inserted memory card 30, or using the serial number of that memory card 30, when the memory card 30 has a larger capacity, and stores the expanded map data on the inserted memory card 30. By constructing the kiosk terminal 20 in this way (i.e., by giving the kiosk terminal 20 a decrypting function), it is initially possible for a user that has stored the map data of a limited region on a small capacity memory card 30 to restore more map data including the map data of that limited region, or restore the map data of the limited area along with different map data on a single large capacity memory card 30.

Figure 7:
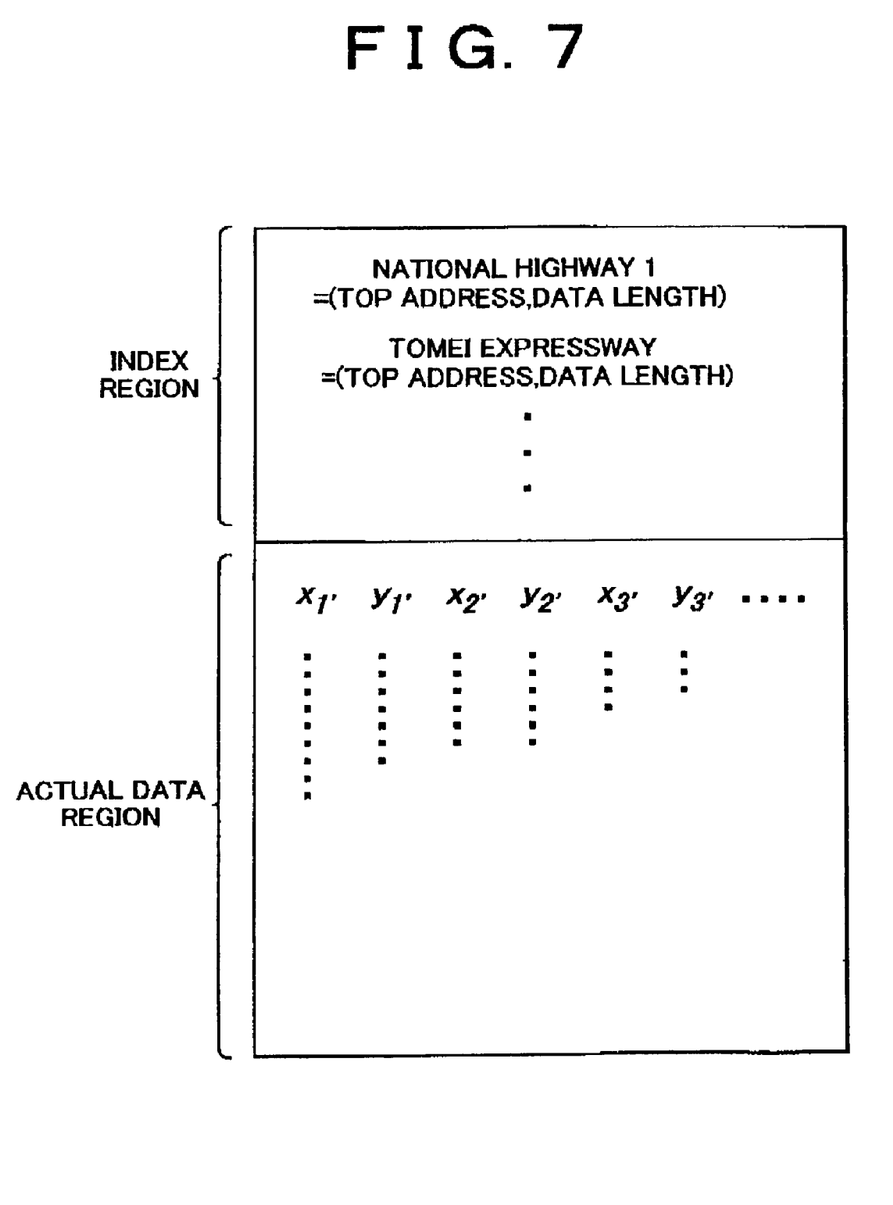
FIG. 7 is a view showing an example of the map data configuration.

Also, according to the foregoing exemplary embodiment, the encrypted portion of the map data may be the entire index region in the map data or a portion thereof. That is, as shown in FIG. 7, the map data is divided into an actual data region and an index region. In the actual data region is stored a plurality of position data expressing the position of road nodes and facilities and the like by longitude x and latitude y. In the index region is stored index data identifying a top address of i) data indicating (the node of) each road or the name (by classification) of each facility for the purpose of identify the node of each road and each facility, as well as of ii) position data indicating that road or facility. The index data also identifies the data length of that top address. When the map data is divided into the actual data region and the index region in this way, the data of either all or a portion of the index region may be encrypted. Further, the memory card 30 of this exemplary embodiment may also be another recording medium, such as a CD-ROM, as long as it is portable and can read and write (i.e., store) data.

Also, in the foregoing exemplary embodiment, the kiosk terminal 20 is used as means (a device) for providing the map data (i.e., information) to the memory card 30. Alternatively, however, a center (i.e., map data distributing server) that provides map data and a personal computer may also be used as means to provide the map data to the memory card 30. The invention may also be applied in this case, as well.

More specifically, map data is provided to the personal computer via transmission from a center that stores the map data. Also, a special application is installed in the personal computer for storing the map data on the memory card 30. Then, using this special software, the personal computer encrypts the map data (or a portion of the map data) provided by (i.e., sent from) the center and stores the encrypted map data on the memory card 30. This encryption is done using the serial number of the memory card 30 that stores the map data, just as in the aforementioned exemplary embodiment. Accordingly, the map data stored on the memory card 30 by the personal computer is decrypted by the navigation system 10, just like the map data stored on the memory card 30 by the kiosk terminal 20, and is then used for route guidance and the like.

In this case, the map data provided by (i.e., sent from) the center to the personal computer is temporarily stored unencrypted in the personal computer. However, the special application erases the data from the personal computer immediately after it has been stored on the memory card 30 as described above, thereby minimizing illegal copying of the map data onto the memory card 30.

Moreover, during transmission of the map data from the center to the personal computer, it is preferable that the map data be sent to the personal computer after being encrypted with a general encryption by the center in order to prevent the map data from being illegally intercepted (i.e., copied) by a third party. In this case, the personal computer decrypts the map data after receiving it from the center, and stores it on the memory card 30 after encrypting it with a particular encryption by the special application.

In addition, according to the foregoing exemplary embodiment, encryption and decryption are done using the serial number of the memory card 30. The serial number itself, however, may also be encrypted and decrypted as described above. That is, when manufacturing the memory card 30, the serial number can be encrypted by a predetermined method, and that encrypted serial number can then be stored on the memory card 30. Then the kiosk terminal 20 first decrypts the encrypted serial number on the memory card 30 that has been inserted into the kiosk terminal 20 and obtains the normal serial number. Using this normal serial number, the kiosk terminal 20 encrypts a portion of the map data which it then stores on the memory card 30. Meanwhile, the navigation system 10 decrypts the encrypted serial number on the memory card 30 that has been inserted into the navigation system 10 and obtains the normal serial number. Using this normal serial number, the navigation system 10 decrypts the encrypted portion of the map data on the memory card 30 and uses the decrypted map data for route guidance and the like. Accordingly, because both the serial number and the map data need to be both encrypted and decrypted in this way, the effect of preventing illegal use of the map data is improved even more.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An on-board map data processing device that handles map data, a portion of the data being encrypted and stored on a portable storage medium, the on-board map data processing device comprising:
    a holding portion that detachably holds the portable storage medium; and
    a controller that:
        decrypts an encrypted portion of the map data that is stored on the storage medium using a code specific to the storage medium, only a portion of the map data that is stored on the storage medium being encrypted;
        creates an expanded map data to be stored by adding a different map data to the decrypted map data; and
        stores the expanded map data,
    wherein the encrypted portion includes at least one of:
        a region more dense with roads as compared to other regions of the map data;
        a region more dense with facilities as compared to other regions of the map data;
        a road larger than other roads of the map data; and
        a facility larger than other facilities of the map data;
    the storage medium has the code specific to the storage medium stored therein and the controller encrypts only a portion of the expanded map data based on the code that is specific to, and stored on, the storage medium on which the expanded map data is to be stored.

2. The on-board map data processing device according to claim 1, wherein:
    the specific code stored on the storage medium is encrypted, and the controller decrypts the encrypted specific code.

3. The on-board map data processing device according to claim 2, wherein:

the controller decrypts the encrypted portion of the map data only when the decrypted code specific to the storage medium and the specific code indicated by the specific code data that is stored together with the map data read from the storage medium match.

4. The on-board map data processing device according to claim 1, wherein the encrypted portion includes the road larger than other roads of the map data.

5. The on-board map data processing device according to claim 1, wherein the encrypted portion includes the facility larger than other facilities of the map data.

6. A map data processing device that handles map data, a portion of the map data being encrypted and stored on a portable storage medium, the map data processing device comprising:

a holding portion that detachably holds the portable storage medium; and a controller that:

decrypts the map data using a code specific to the storage medium on which the map data is stored;

creates an expanded map data to be stored by adding a different map data to the decrypted map data; and stores the expanded map data, a portion of which is encrypted, on the portable storage medium held in the holding portion, wherein the controller encrypts only a portion including at least one of a region more dense with roads as compared to other regions of the map data, a region more dense with facilities as compared to other regions of the map data, a road larger than other roads of the map data, and a facility larger than other facilities of the map data of the expanded map data based on the code that is specific to, and stored on, the storage medium on which the expanded map data is to be stored.

7. An on-board map data processing device that handles map data, a portion of the map data being encrypted and stored on a portable storage medium and another portion of the map data being unencrypted and stored on the portable storage medium, the on-board map data processing device comprising:

a holding portion that detachably holds the portable storage medium; and a controller that:

decrypts the encrypted portion of the map data that is stored on the storage medium using a code specific to the storage medium;

creates an expanded map data to be stored by adding a different map data to the decrypted map data; and stores the expanded map data, wherein the encrypted portion includes at least one of:

a region more dense with roads as compared to regions of the unencrypted map data;

a region more dense with facilities as compared to regions of the unencrypted map data;

a road larger than roads of the unencrypted map data; and a facility larger than facilities of the unencrypted map data;

the storage medium has the code specific to the storage medium stored therein and the controller encrypts only a portion of the expanded map data based on the code that is specific to, and stored on, the storage medium on which the expanded map data is to be stored.

8. A map data processing device that handles map data, a portion of the map data being encrypted and stored on a portable storage medium and another portion of the map data being unencrypted and stored on the portable storage medium, the map data processing device comprising:

a holding portion that detachably holds the portable storage medium; and a controller that:

decrypts the map data using a code specific to the storage medium on which the map data is stored;

creates an expanded map data to be stored by adding a different map data to the decrypted map data; and stores the expanded map data, a portion of which is encrypted, on the portable storage medium held in the holding portion, wherein the controller encrypts only a portion including at least one of a region more dense with roads as compared to regions of the unencrypted map data, a region more dense with facilities as compared to regions of the unencrypted map data, a road larger than roads of the unencrypted map data, and a facility larger than facilities of the unencrypted map data of the expanded map data based on the code that is specific to, and stored on, the storage medium on which the expanded map data is to be stored.

* * * * *